Patented Aug. 20, 1940

2,212,171

UNITED STATES PATENT OFFICE 2,212,171

AMINE-SULPHAMIC ACID ADDITION PRODUCT

Paul L. Salzberg, Wilmington, Del., assignor to E. I. du Pont de Nemours & Co., Wilmington, Del., a corporation of Delaware No Drawing. Application August 17, 1938, Serial No. 225,469

7 Claims. (Cl. 260—583)

This invention relates to new compositions of matter and more particularly to reaction products of long chain amines with sulphamic acid.

This invention has as an object the preparation of new compositions of matter. A further object is the preparation of materials useful as foam assistants, emulsifying agents, wetting out agents, detergents and textile finishing agents. Other objects will appear hereinafter.

These objects are accomplished by the following invention which comprises reacting sulphamic acid with an amine having attached to an amino nitrogen an open hydrocarbon chain of at least eight and preferably eight to eighteen carbon atoms. The amines which will most generally be used in practicing the invention may be represented graphically by the formula

wherein $R^1$ is an alkyl radical having an open chain of at least eight and preferably eight to eighteen carbon atoms, and $R^2$ and $R^3$ are hydrogen or hydrocarbon radicals. The products obtained are isolated, purified, and used in accordance with details which follow.

The sulphamic acid addition products of long chain amines are readily obtained by mixing sulphamic acid with the amine while the latter is dissolved or dispersed in solvents such as water, water-soluble alcohols, or aqueous alcohols. Ethanol and methanol are the preferred solvents. Reaction takes place almost instantly, no heating being necessary. A part of the product usually crystallizes out if the solution is concentrated or non-aqueous, and is allowed to stand for a few hours; in such cases the solid is filtered off and the remainder of the product isolated by vacuum evaporation of the solvent from the filtrate. When no crystallization takes place, the whole amount of the product is isolated by removal of solvent from the solution obtained from the reaction. The product may be dried by warming to 50–60° C. in the air or in a vacuum oven.

The more detailed practice of the invention is illustrated by the following examples, wherein parts given are by weight. There are of course many forms of the invention other than these specific embodiments.

Example I

To 150 parts of a mixture of primary and secondary alkyl amines having chains of from eight to eighteen and predominantly twelve carbon atoms (which mixture is obtained by carboxyl reduction of coconut oil and amination of the resulting alcohols by passing them with ammonia over a suitable catalyst), is added 310 parts of 40% aqueous methanol and 68.5 parts of crystalline sulphamic acid. Upon stirring, a clear homogeneous solution is obtained, which has a neutral reaction toward litmus paper. Upon cooling and standing, a portion of the product crystallizes and can be filtered off. The remainder is isolated by evaporating the solvent from the filtrate under reduced pressure and at a temperature of 50° C. until the residue is essentially dry. This product is a dry, wax-like solid which on being warmed to about 65° C. may be molded or pressed into any desired shape. It is water-soluble and forms solutions having excellent foaming, wetting, emulsifying and detergent properties. For example, raw wool, soiled cotton fabrics, and the like, are rapidly and effectively cleaned by washing in a 0.5% aqueous solution, and finely divided inorganic particles, such as powdered sulphur, chalk and titanium oxide pigment, are completely wetted by solutions containing approximately 0.2% by weight of the product.

Example II

To solution in ethanol of 10 parts of a mixture of octyl and nonyl primary amines (which mixture is obtained by carboxyl reduction of a mixture of n-octoic and n-nonoic acids and amination of the resulting alcohols by passing them with ammonia over a suitable catalyst), is added with stirring 7.1 parts of crystalline sulphamic acid. After stirring for three hours, the insoluble product which forms is separated by filtration, washed with acetone and allowed to dry. Evaporation of the filtrate yields only a small amount of additional product. The dry product can be pressed and molded as in Example I. It may be stored for 12 months or more in powder form without noticeable deterioration or change. It is highly soluble in water and 80% methanol yielding solutions have foaming, emulsifying and detergent properties.

Example III

To a solution of 1 mol n-decylamine (157 parts) dissolved in 20 mols of ethanol (920 parts) is added slowly with stirring 1 mol (97 parts) of powdered sulphamic acid. After stirring for two hours, the finely divided, insoluble reaction product is filtered from solution and dried at 50° C. The dry product, a soft, impalpable powder, is readily soluble in water and has excellent foaming, wetting and detergent properties.

Two hundred ninety-eight (298) parts of di-n- decylamine (1 mol) may be used in place of the n-decylamine in the above example and similar results are obtained.

Example IV

To a solution comprising 185 parts of n-dodecylamine dissolved in 1000 parts methanol, is added with stirring 97 parts of finely powdered, dry, sulphamic acid. After stirring for about 2 hours, the precipitated product is separated by filtration and dried. The dry product may be readily molded into any desired shape by well-known procedures. The product is readily soluble in water and shows excellent wetting, foaming and general surface active properties.

One hundred eighty-three (183) parts of n-dodecenylamine may be used in place of the dodecylamine in the above example and similar results will be obtained.

Example V

To a suspension of 10 parts n-octadecylamine in anhydrous methanol is added 10 parts of crystalline sulphamic acid and the mixture stirred for about six hours. At the end of this period the reaction product has formed as a finely divided suspension which may be readily separated from the excess sulphamic acid by allowing the heavy crystals of the acid to settle to the bottom of the container and then decanting off the suspension. The solid product is then filtered and dried. It is a white waxy solid which is soluble in 40-60% methanol but insoluble in water and anhydrous methanol. A cotton fabric impregnated with the product by dipping into a 5% solution of the product dissolved in 50% methanol, and drying, has a soft handle and feel and shows excellent draping qualities.

Octadecenylamine may be used in place of n-octadecylamine in the above example in similar results are obtained.

The above examples are only illustrative. There may be used in the practice of the invention any monomeric amine having, attached to an amino nitrogen atom, an open hydrocarbon chain of at least eight carbon atoms, or any mixture of such amines. Amines having eight to eighteen carbon atoms in the mentioned hydrocarbon chain are, however, preferred because of the superior foaming or surface active properties of the resulting products. Those having less carbon atoms in the chain form products having little or no surface active effect, and those having alkyl chains longer than eighteen carbon atoms form products which are less soluble, particularly in water, and are thus of less commercial interest. Subject to the carbon chain restriction, the amine may thus be primary, secondary, or tertiary; saturated or unsaturated; and a mono- or polyamine. The preferred types may be formulated as

wherein $R^1$ is an acyclic hydrocarbon radical having a chain of at least 8 and preferably 8 to 18 carbons, and $R^2$ and $R^3$ are hydrogen or hydrocarbon radicals, or they may together form a divalent hydrocarbon radical. Suitable specific amines include the following: n-octylamine, n-nonylamine, n-decylamine, n-dodecylamine, n-hexadecylamine, n-octadecylamine, di-n-octylamine, tri-n-octylamine, di-n-octenylamine, tri-n-octenylamine, di-n-decylamine, tri-n-decylamine, di-n-decenylamine, tri-n-decenylamine, 6-ethyloctylamine, 8-pentadecylamine, methyl-8-pentadecylamine, dimethyl-8-pentadecylamine, cyclohexyloctylamine, benzyloctylamine, and the like.

As heretofore indicated, the products of the present invention are useful for making molded objects of any predetermined type, such as bars, tubes, prisms, spheres, and cubes. The application of mild heat, e. g. 40-80° C. is desirable since molding is thereby facilitated and forms are produced which have a denser structure and greater strength. If even stronger objects are desired, binders and reinforcing agents such as chalk, wood flour, or fibrous materials may be added.

The products of the invention are also useful as foaming, wetting, emulsifying and detergent agents, as finishing agents for cotton fabrics. They are also useful as flotation agents in the separation of ore and coal from siliceous matter.

The wax-like solid products of the present invention differ importantly in their preparation, properties and uses from the products obtained from (a) long chain amines and acids other than sulphamic; (b) short chain amines and sulphamic acid.

With respect to (a) the products of the present invention are only limitedly hygroscopic and can be easily isolated and kept in the dry, solid state, whereas analogous products from many other acids, especially acetic, show a strong tendency to absorb water and are quite difficult to isolate and maintain as solids. Also the long chain amine-sulphamic acid compounds are more stable than products from weak acids such as acetic, oxalic, lactic, carbonic, sulphurous, succinic, and benzoic, the instability of the latter making almost impossible their preparation and preservation in the pure state. For example, the acetic acid compound of the amine mixture used in Example I will not be prepared in pure condition because the acetic acid slowly volatilized when attempts were made to isolate and dry the product under reduced pressure. In some instances, as with weakly basic very long chain amines such as n-octadecylamine, no appreciable reaction will take place with weak acids such as formic, lactic, and acetic, or, if a noticeable reaction does occur, the products are, as just explained, instable, in that they hydrolyze easily or decompose on exposure to air, on being subjected to reduced pressure, or on being washed with solvents in which the acid is soluble. The long chain amine-sulphamic acid products do not have these defects. The products obtained from long chain amines and strong acids such as hydrochloric and sulphuric are also inferior to and of less technical use than the long chain amine-sulphamic acid products. For instance, the product obtained from sulphuric acid and the amine mixture used in Example I was considerably less soluble in water than, and greatly inferior in molding properties to, the product of that example. The product from hydrochloric acid and this amine mixture was considerably more difficult of isolation than the sulphamic acid product and produced more severe corrosion of equipment when molded. Similarly, the products from hydrochloric and sulphuric acids and the amine mixture used in Example II were greatly inferior in moldability to the product of that example; and, further, on being stored for 12 months, became discolored and showed a tendency to absorb moisture on exposure to air. Again, the product from n-octadecylamine and sulphuric acid was insoluble in water and useless as a textile treating agent (compare Example V). A still further point is that the reaction products of sulphuric and hydrochloric acids with n-octadeylamine are not readily prepared because of difficulty in obtaining exact neutralization, and because of the subsequent partial hydrolysis which takes place when attempts are made to remove uncombined acid by working; in this instance, too, sulphuric acid has a tendency to unite chemically with the alcoholic solvents ordinarily used, such complication contributing still further to anomalous results.

With respect to (b), the products obtained by reacting sulphamic acid with lower alkylamines, such as mono-, di-, and tri-n-amylamines, have no foaming or surface active properties. It is only with amines having long open hydrocarbon chains (i. e., 8 or more carbons) that products are formed which exhibit these properties to such an extent that they are of practical value as detergents and for similar uses.

In the claims, the term "aliphatic" includes in its scope the term "cycloaliphatic."

The above description and examples are intended to be illustrative only. Any modification of or variation therefrom which conforms to the spirit of the invention is intended to be included within the scope of the claims.

I claim:

1. An addition product of sulphamic acid with an amine, said addition product having the formula

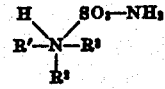

wherein R' is an alkyl radical having an open chain of at least 8 carbon atoms and R² and R³ are selected from the class consisting of hydrogen and monovalent hydrocarbon radicals joined to the nitrogen by aliphatic carbon.

2. An addition product of sulphamic acid with an amine, said addition product having the formula

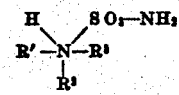

wherein R' is an alkyl radical having an open chain of 8–18 carbon atoms and R² and R³ are selected from the class consisting of hydrogen and monovalent hydrocarbon radicals joined to the nitrogen by aliphatic carbon.

3. An addition product of sulphamic acid and a primary alkyl monoamine having, attached to the amino nitrogen, an open chain of at least eight carbon atoms.

4. An addition product of sulphamic acid and a primary alkyl monoamine having, attached to the amino nitrogen, an open chain of 8–18 carbons.

5. An addition product of sulphamic acid and n-dodecylamine.

6. An addition product of sulphamic acid and cyclohexyl-n-octylamine.

7. An addition product of sulphamic acid and the mixture of primary and secondary alkylamines having chains of from eight to eighteen, and predominantly twelve, carbon atoms, which mixture is obtained by carboxyl reduction of coconut oil and amination of the resulting alcohols by passing them with ammonia over a suitable catalyst.

PAUL L. SALZBERG.